US009030466B2

United States Patent
Uehira et al.

(10) Patent No.: US 9,030,466 B2
(45) Date of Patent: May 12, 2015

(54) GENERATION OF DEPTH DATA BASED ON SPATIAL LIGHT PATTERN

(75) Inventors: Kazutake Uehira, Tokyo (JP); Masahiro Suzuki, Saitama (JP)

(73) Assignee: Empire Technology Development LLC, Wilmington, DE (US)

( * ) Notice: Subject to any disclaimer, the term of this patent is extended or adjusted under 35 U.S.C. 154(b) by 707 days.

(21) Appl. No.: 13/122,912

(22) PCT Filed: Oct. 5, 2010

(86) PCT No.: PCT/JP2010/005965
§ 371 (c)(1),
(2), (4) Date: Apr. 6, 2011

(87) PCT Pub. No.: WO2012/046270
PCT Pub. Date: Apr. 12, 2012

(65) Prior Publication Data
US 2012/0081360 A1    Apr. 5, 2012

(51) Int. Cl.
*G06T 15/00*  (2011.01)
*G01B 11/25*  (2006.01)

(52) U.S. Cl.
CPC ........ *G01B 11/2513* (2013.01); *G01B 11/2545* (2013.01)

(58) Field of Classification Search
CPC ............. G06T 7/0075; G06T 2207/10012; G06T 7/0022; H04N 13/0239; H04N 2013/0081
USPC .......... 345/419, 420, 422, 424; 382/274, 154, 382/279, 285, 212; 348/46, 349, 43
See application file for complete search history.

(56) References Cited

U.S. PATENT DOCUMENTS

| 4,743,771 | A | * | 5/1988 | Sacks et al. ............... 250/559.22 |
| 4,920,273 | A |   | 4/1990 | Sacks et al. |
| 5,305,092 | A |   | 4/1994 | Mimura et al. |
| 6,229,913 | B1 | * | 5/2001 | Nayar et al. .................. 382/154 |
| 6,330,066 | B1 | * | 12/2001 | Tanaka et al. ................. 356/609 |

(Continued)

FOREIGN PATENT DOCUMENTS

| JP | 62002118 A | 1/1987 |
| JP | 5060528 A | 3/1993 |

(Continued)

OTHER PUBLICATIONS

Kahn et al. "Hiding Depth Map of an Object in its 2D Image: Reversible Watermarking for 3D Cameras", http://www.computer.org/portal/web/csdl/doi/10.1109/ICCE.2009.5012226, accessed Jul. 15, 2010, 2009.

(Continued)

*Primary Examiner* — Abderrahim Merouan
(74) *Attorney, Agent, or Firm* — Dorsey & Whitney LLP

(57) ABSTRACT

Technologies are generally described for generating depth data based on a spatial light pattern. In some examples, a method of generating depth data includes obtaining an image of one or more objects on which a spatial light pattern is projected, wherein blurring of the spatial light pattern in the image monotonously increases or decreases in a depth direction, calculating a value of a spatial frequency component of the image in a local image area around a pixel of interest, and determining depth data corresponding to the calculated value of the spatial frequency component by utilizing a preset relationship between depths and values of the spatial frequency component.

19 Claims, 9 Drawing Sheets

(56) References Cited

U.S. PATENT DOCUMENTS

| | | | |
|---|---|---|---|
| 6,947,582 B1* | 9/2005 | Vilsmeier et al. | 382/128 |
| 7,342,608 B2 | 3/2008 | Yoshida | |
| 7,440,590 B1 | 10/2008 | Hassebrook et al. | |
| 7,583,272 B2* | 9/2009 | Ramani et al. | 345/621 |
| 7,602,999 B2* | 10/2009 | Konishi | 382/305 |
| 8,885,941 B2* | 11/2014 | Schiller et al. | 382/180 |
| 2005/0254688 A1* | 11/2005 | Franz | 382/104 |
| 2006/0098231 A1* | 5/2006 | Konishi | 358/3.21 |
| 2007/0140333 A1* | 6/2007 | Chono et al. | 375/240.03 |
| 2007/0177160 A1 | 8/2007 | Sasaki | |
| 2009/0187242 A1* | 7/2009 | Weeber et al. | 623/6.24 |
| 2009/0234448 A1* | 9/2009 | Weeber et al. | 623/6.3 |
| 2009/0238449 A1 | 9/2009 | Zhang et al. | |
| 2009/0268985 A1* | 10/2009 | Wong et al. | 382/299 |
| 2010/0278390 A1* | 11/2010 | Silveira et al. | 382/106 |
| 2010/0296751 A1* | 11/2010 | Yanai | 382/274 |
| 2011/0080400 A1* | 4/2011 | Yamada | 345/419 |
| 2011/0150082 A1* | 6/2011 | Lu et al. | 375/240.03 |
| 2011/0176708 A1* | 7/2011 | Silveira et al. | 382/103 |
| 2012/0257029 A1* | 10/2012 | Igarashi et al. | 348/68 |

FOREIGN PATENT DOCUMENTS

| | | |
|---|---|---|
| JP | 10508107 A | 8/1998 |
| JP | 2001 027517 A | 1/2001 |
| JP | 2005 017805 A | 1/2005 |
| JP | 2006-098252 | 4/2006 |
| JP | 2009 008649 A | 1/2009 |
| WO | WO 2008/120217 A2 | 10/2008 |

OTHER PUBLICATIONS

PCT Application No: PCT/JP2010/005965, International Search Report, Filing date: May 10, 2010, Mailing date: Dec. 28, 2010, 7 pages.

Song Zhang, "3D Surface Data Acquisition", Department of Mechanical Engineering, for class: CSE612, Oct. 16, 2003, 1-32.

* cited by examiner

GENERATION OF DEPTH DATA BASED ON SPATIAL LIGHT PATTERN

CROSS-REFERENCE TO RELATED APPLICATIONS

This application is the National Stage filing under 35 U.S.C §371 of International Application No. PCT/JP2010/005965, filed Oct. 5, 2010, the disclosure of which is incorporated herein by reference in its entirety.

TECHNICAL FIELD

The disclosures herein generally relate to the generation of depth data.

BACKGROUND

Unless otherwise indicated herein, the approaches described in this section are not prior art to the claims in this application and are not admitted to be prior art by inclusion in this section.

Images for stereoscopic viewing may be composed of an image for the right eye and an image for the left eye. The observer may typically use special glasses that make the right eye see only the image for the right eye and the left eye see only the image for the left eye, thereby giving the observer the perception of a three-dimensional scene. There may be two typical methods for transmitting image data for stereoscopic viewing. The first method may involve sending both left-eye and right-eye images, which may result in twice as much data as normal 2D-image data being transmitted. The second method may involve creating a depth map from a left-eye image and a right-eye image and then transmitting the resulting depth map together with either the left-eye or right-eye image. The recipient of the data may use the depth map to recreate one of the two images that has not been sent. The second method may also result in a larger amount of data than normal 2D-image data being transmitted. Further, the need to generate a depth map at a transmission side may impose additional computation load.

SUMMARY

According to one or more embodiments, a method of generating depth data includes calculating a value of a spatial frequency component of image data in a local image area around a pixel of interest, wherein the image data is representative of one or more objects on which a spatial light pattern is projected and blurring of the spatial light pattern in the image data increases or decreases in a depth direction, and determining depth data corresponding to the calculated value of the spatial frequency component by utilizing a preset relationship between depths and values of the spatial frequency component.

According to one or more embodiments, an apparatus for generating depth data includes a frequency component calculating unit configured to calculate a value of a spatial frequency component of image data in a local image area around a pixel of interest, wherein the image data is representative of one or more objects on which a spatial light pattern is projected and blurring of the spatial light pattern in the image data increases or decreases in a depth direction, and a depth map generating unit configured to determine depth data corresponding to the calculated value of the spatial frequency component by utilizing a preset relationship between depths and values of the spatial frequency component.

According to one or more embodiments, a system for generating depth data includes a projection unit configured to project a spatial light pattern; and an imaging unit configured to capture an image of one or more objects on which the spatial light pattern is projected, wherein blurring of the spatial light pattern in the image increases or decreases in a depth direction such that depth data corresponding to a calculated value of a spatial frequency component of the image in a local image area around a pixel of interest can be determined by utilizing a preset relationship between depths and values of the spatial frequency component.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The subject matter of the present disclosure is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

Figure 1:
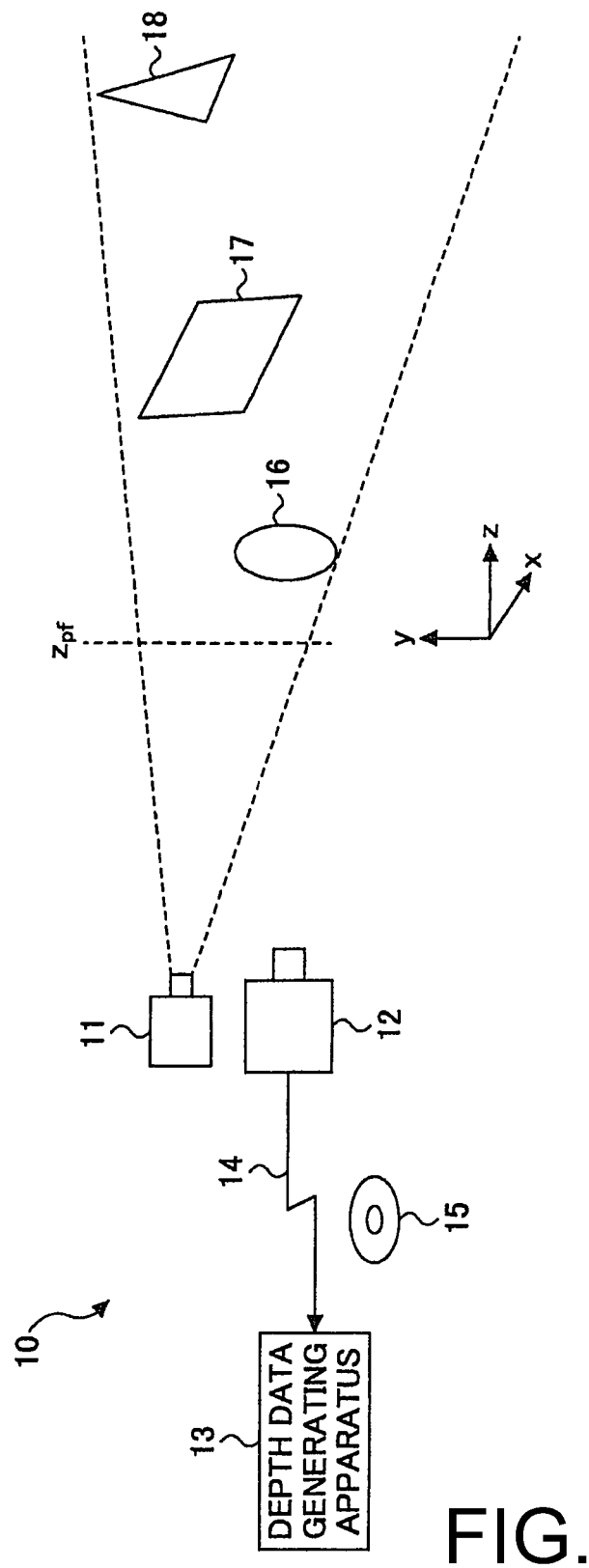
FIG. 1 is a drawing illustrating an example of a depth data generating system.

The following detailed description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is drawn, inter alia, to methods, apparatus, devices, and/or systems related to the generation of depth data.

Briefly stated, technologies are generally described herein for a method of and apparatus for generating depth data. In some examples, the method may include obtaining an image of one or more objects on which a spatial light pattern is projected, wherein blurring of the spatial light pattern in the image monotonously increases or decreases in a depth direction, calculating a value of a spatial frequency component of the image in a local image area around a pixel of interest, and determining depth data corresponding to the calculated value of the spatial frequency component by utilizing a preset relationship between depths and values of the spatial frequency component.

FIG. 1 is a drawing illustrating an example of a depth data generating system arranged in accordance with at least some embodiments described herein. A depth data generating system 10 illustrated in FIG. 1 may include a projection unit 11, an imaging unit 12, and a depth data generating apparatus 13. For the sake of convenience of explanation, three orthogonal directions in space may be represented by the x, y, and z axes of a coordinate system, with the z axis corresponding to the depth direction of the projection unit 11 and the imaging unit 12. The projection unit 11 may be configured to emit a spatial light pattern. The projection unit 11 may be a conventional projector capable of projecting a high-definition image generated by a film medium or the like. The projection unit 11 may alternatively be a digital projector employing liquid-crystal-display panels or a DLP (digital light processing) projector employing Digital Micro-Mirror Devices. In such a case, display data of the spatial light pattern to be projected may be input into the projection unit 11. The imaging unit 12 may be configured to capture an image of one or more objects 16 through 18 on which the spatial light pattern is projected. The imaging unit 12 may be a camera that employs an imaging device such as a CCD (Charge Coupled Device) image sensor or CMOS (Complementary Metal Oxide Semiconductor) image sensor. The optical system parameters of the projection unit 11 and the imaging unit 12 may be adjusted such that blurring of the spatial light pattern in the captured image monotonously increases or decreases in the depth direction z. How to achieve such optical system parameters may be described later in detail.

The imaging unit 12 may operate as a still camera to produce a single image at a time, or may operate as a video or motion camera to produce a series of images continuously during an activated state. Images produced or generated by the imaging unit 12 are supplied to the depth data generating apparatus 13. The supply of the images may be via a transitory medium 14 or a non-transitory medium 15. The transitory medium 14 may be a communication line through which electrical signals are transmitted, or may be space through which electromagnetic signals are transmitted. The non-transitory medium 15 may be a tangible recording medium such as a Compact Disc (CD), a Digital Versatile Disk (DVD), a memory card, or the like.

The depth data generating apparatus 13 may be configured to generate depth data indicative of a position z in the depth direction at a pixel corresponding to any given x, y position in an image captured by the imaging unit 12. Such depth data may be extracted from an image captured by the imaging unit 12. Namely, the depth data generating apparatus 13 may generate depth data indicative of the distance of the object 16, for example, from the imaging unit 12 by analyzing the image captured by the imaging unit 12. The depth data generating apparatus 13 may generate a depth map indicative of depths at all the pixels in the image.

In order to generate depth data, the depth data generating apparatus 13 may calculate a value of a pre-determined spatial frequency component of the image in a local image area around a pixel of interest. The depth data generating apparatus 13 may then determine depth data corresponding to the calculated value of the spatial frequency component by utilizing a preset relationship between depths and values of the spatial frequency component. As previously noted, the blurring of the spatial light pattern in the captured image may monotonously increase or decrease in the depth direction z. In such a case, the value of the predetermined spatial frequency component may monotonously increase or decrease in the depth direction z. The relationship between depths and values of the predetermined spatial frequency component may be provided as a mathematical formula. Alternatively, the relationship between depths and values of the predetermined spatial frequency component may be obtained in advance and stored as a lookup table or the like in memory. This lookup table may be referred to when determining depth data, so that a depth value corresponding to the value of the predetermined spatial frequency component calculated for a pixel of interest may be located in the table.

Figure 2:
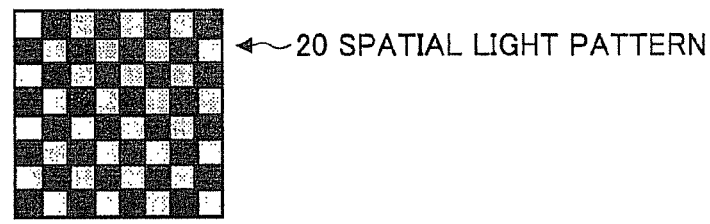
FIG. 2 is a drawing illustrating an example of a spatial light pattern.

FIG. 2 is a drawing illustrating an example of the spatial light pattern arranged in accordance with at least some embodiments described herein. In this example, the spatial light pattern may be a checkerboard pattern in which black square areas and white square areas are arranged alternately both in the vertical direction and in the horizontal direction. The projection unit 11 and the imaging unit 12 may be configured to have substantially the same angle of view. In such a case, each square area of the spatial light pattern projected by the projection unit 11 on a surface may appear to have a constant two-dimensional size in an image taken by the imaging unit 12 regardless of the distance z of the surface from the projection unit 11. That is, in the example illustrated in FIG. 1, the spatial light pattern projected on the surface of the object 16 may appear to have the same size as the spatial light pattern projected on the surface of the object 17 or 18 when viewed by the imaging unit 12. The projection unit 11 may be configured to have a focus position at a point $z_{pf}$ in the depth direction such that the focus point $z_{pf}$ is nearer than any objects (e.g., 16, 17, 18) that may be captured by the imaging unit 12. This arrangement may ensure that the blurring of the spatial light pattern monotonously increases in the depth direction z on an object surface situated at depth z. The projection unit 11 may have a focus position that is farther away from the projection unit 11 than any objects. This arrangement may ensure that the blurring of the spatial light pattern monotonously decreases in the depth direction z on an object surface situated at depth z.

Figure 3:
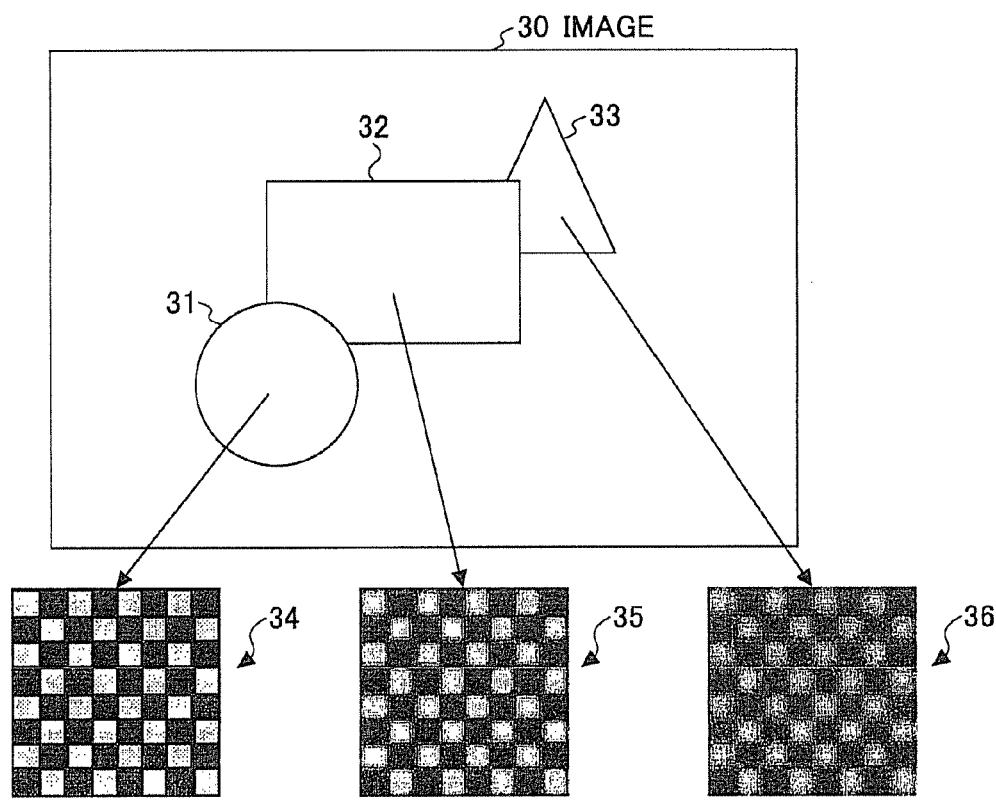
FIG. 3 is a drawing illustrating an example of the blurring of a spatial light pattern that monotonously increases in the depth direction on an object surface.

FIG. 3 is a drawing illustrating an example of the blurring of a spatial light pattern that monotonously increases in the depth direction z on an object surface arranged in accordance with at least some embodiments described herein. In FIG. 3, an image 30 captured by the imaging unit 12 may include an image 31 of the object 16 (see FIG. 1), an image 32 of the object 17, and an image 33 of the object 18. As illustrated in FIG. 1, the object 16, the object 17, and the object 18 may be arranged in the depicted order in the depth direction z, with the object 16 being the nearest to the imaging unit 12. In such a case, a spatial light pattern 34 projected on the nearest object 16 may be the sharpest, and a spatial light pattern 36 projected on the farthest object 18 may be the most blurred, with a spatial light pattern 35 projected on the object 17 being in the middle in terms of sharpness. Depth data may be extracted from the image 30 by analyzing, in a local image area of interest, the value of the predetermined frequency component which may be a function of the degree of blurring of the spatial light patterns 34, 35, and 36 appearing in the image 30.

The spatial light pattern projected by the projection unit 11 may be configured such that the spatial light patterns 34, 35, and 36 appearing in the captured image 30 are so fine that a person looking at the image 30 may not recognize the existence of the spatial light patterns. Such a fine light pattern may be produced by a digital projector which employs a liquid-crystal-display panel having a large number of pixels such as 1280×1024 pixels, 1920×1080 pixels, or the like. Under normal viewing conditions, human view may not perceive details as small as the size of a few pixels. That is, the spatial light patterns appearing in the image may be periodic at spatial frequency that is higher than spatial frequencies perceivable to human vision when the image is viewed. This arrangement may ensure that the quality of the image 30 from an aesthetic point of view be not undermined by the superimposed spatial light patterns. It may be noted, however, that the size of each square area of the checkerboard pattern may be at least twice as large as the pixel size both in the x direction and in the y direction. This arrangement may ensure that a proper sampling pitch be achieved by the imaging unit 12 in order to extract accurate information about the frequency components of the spatial light pattern.

The description provided above in respect of the spatial light pattern appearing in the image 30 of FIG. 3 has not taken into account the focusing of the imaging unit 12. If the imaging unit 12 is a pinhole camera, for example, the imaging unit 12 may be able to focus on any object at any distance. In such a case, a spatial light pattern projected on a given object surface may appear blurred in the captured image as it is on the object surface. That is, the focusing of the imaging unit 12 may be disregarded under some circumstances.

In reality, however, the characteristics of the optical system of the imaging unit 12 may affect the blurring of the spatial light pattern that appears in a captured image. That is, the focusing of the imaging unit 12 in addition to the focusing of the projection unit 11 may need to be taken into account when generating depth data from the image captured by the imaging unit 12. In some circumstances, the imaging unit 12 may focus on the object 16 that is an object of interest. In other circumstances, the imaging unit 12 may focus on the object 17 that is an object of interest, and may then focus on the object 18 that is a next object of interest. How to take into account the focusing of the imaging unit 12 and changes in its focus position are further described below. It may be noted here, however, that despite the focusing of the imaging unit 12, provision may easily be made such that the blurring of the spatial light pattern in the captured image monotonously increases or decreases in the depth direction z. Such monotonous characteristics may be provided by ensuring that a monotonous blurring increase (or decrease) in the depth direction caused by the projection unit 11 be predominant over a blurring change in the depth direction caused by the imaging unit 12.

Figure 4:
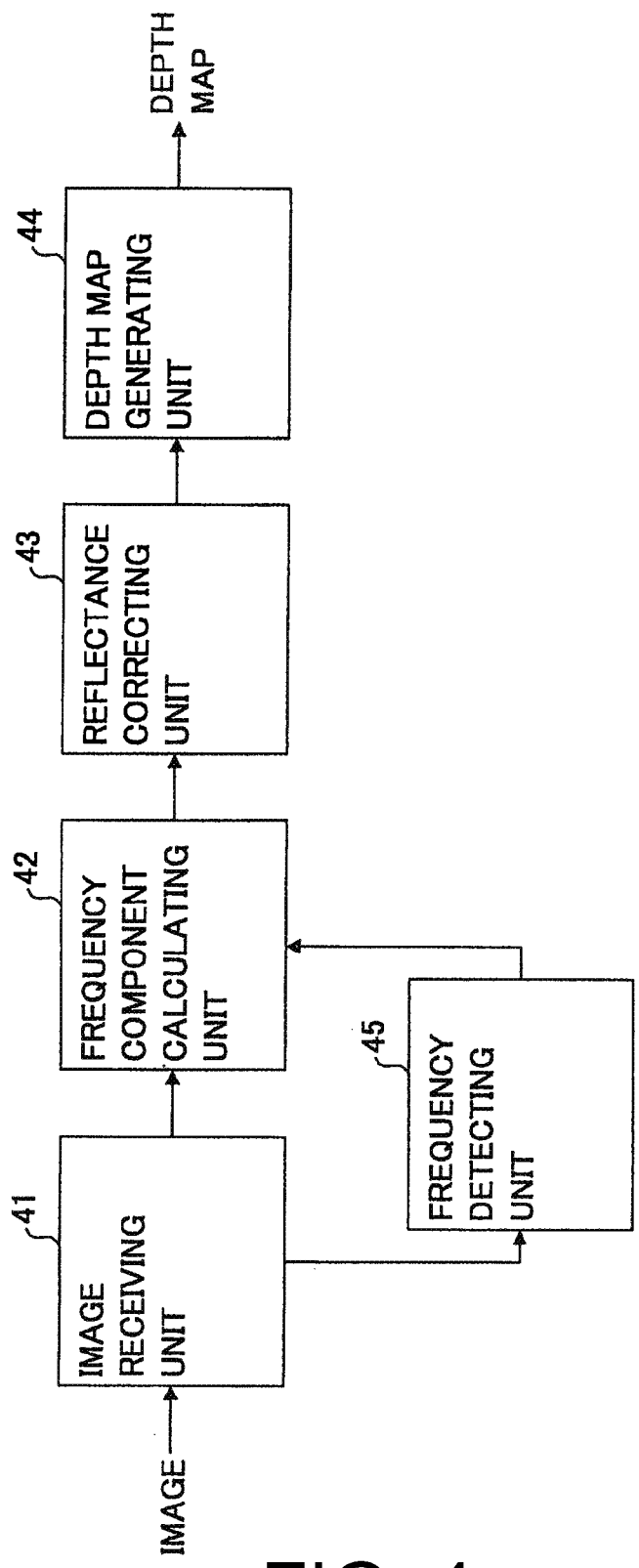
FIG. 4 is a block diagram illustrating an example of the configuration of a depth data generating apparatus.

FIG. 4 is a block diagram illustrating an example of the configuration of the depth data generating apparatus 13 arranged in accordance with at least some embodiments described herein. The depth data generating apparatus 13 illustrated in FIG. 4 may include an image receiving unit 41, a frequency component calculating unit 42, a reflectance correcting unit 43, a depth map generating unit 44, and a frequency detecting unit 45.

Figure 5:
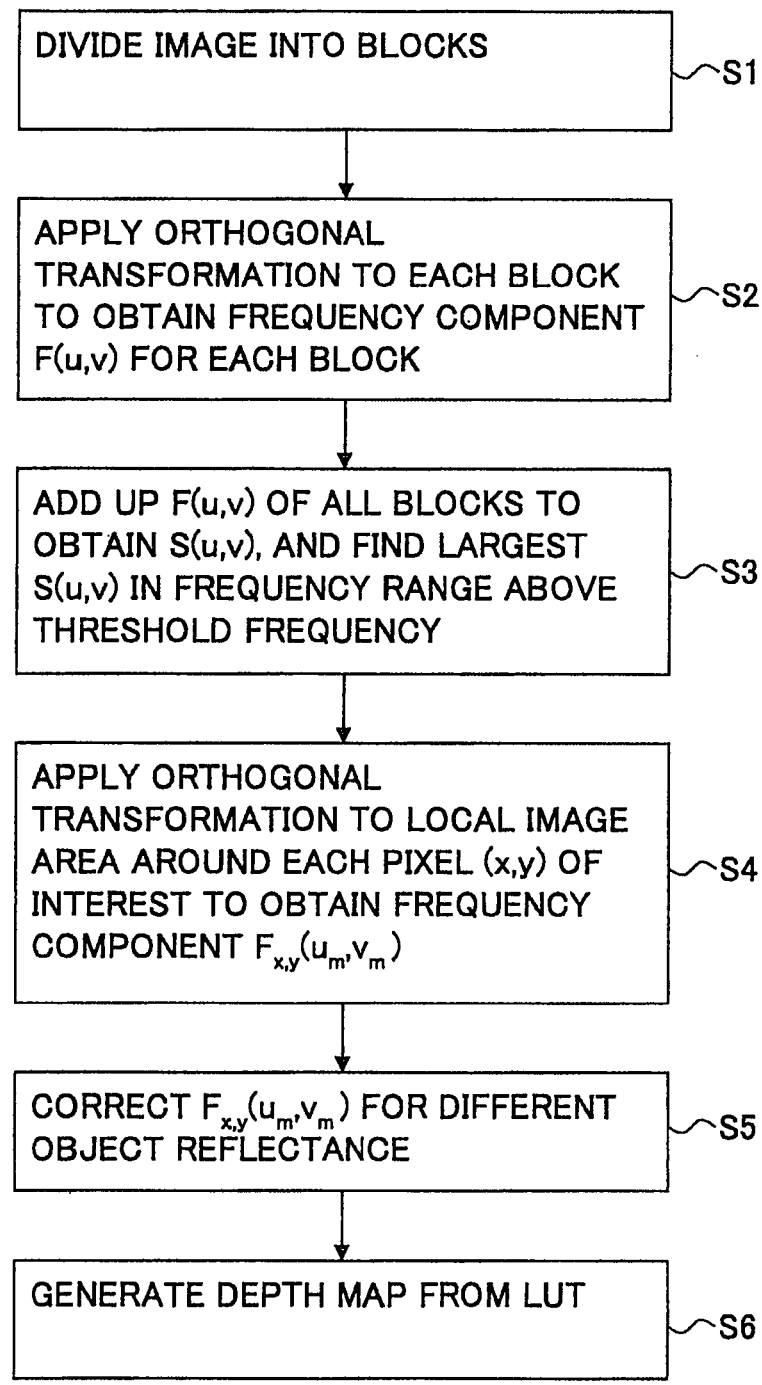
FIG. 5 is a flowchart illustrating a method for generating depth data performed by the depth data generating apparatus.

FIG. 5 is a flowchart illustrating a method for generating depth data performed by the depth data generating apparatus 13 arranged in accordance with at least some embodiments described herein. As depicted, an example method may include one or more operations, actions, or functions as illustrated by one or more of blocks S1, S2, S3, S4, S5 and/or S6. As the method in FIG. 5 could be implemented using, for example, the depth data generating apparatus 13 depicted in FIG. 4, the method for generating depth data will be described by referring to FIG. 4 and FIG. 5.

The image receiving unit 41 may receive from the imaging unit 12 an image of one or more objects on which a spatial light pattern is projected. In this image, the blurring of the spatial light pattern may monotonously increase or decrease in the depth direction. Processing may begin at block S1. At block S1, the frequency detecting unit 45 may divide the image into blocks, each of which may be a rectangular image area comprised of an array of pixels. Processing may continue from block S1 to block S2.

At block S2, the frequency detecting unit 45 may apply orthogonal transformation, such as a Fourier transform or a Hadamard transform, to each block to obtain frequency component $F(u,v)$ for each block. Here, $F(u,v)$ may be a discrete Fourier transform (or Hadamard transform, or any other orthogonal transform) of pixel data $b(x,y)$, which represents the pixel values of the pixel array corresponding to a block of interest. Coordinates x and y may represent pixel positions within the block of interest. Variable u represents spatial frequency in the x direction, and variable v represents spatial frequency in the y direction. Processing may continue from block S2 to block S3.

At block S3, the frequency detecting unit 45 may add up $F(u,v)$ of all the blocks to obtain $S(u,v)$, and may find the largest value of $S(u,v)$ in a frequency range above a threshold frequency. $S(u,v)$ may be the sum of $F(u,v)$ of the first block, $F(u,v)$ of the second block, $F(u,v)$ of the third block, . . . , and $F(u,v)$ of the N-th block when there are N blocks in the image. Since the spatial light pattern periodic at certain spatial frequency is included in the image, $S(u,v)$ may have a local maximum value at this spatial frequency within a frequency range above a certain threshold frequency. This threshold frequency may be determined by taking into account the spatial frequency at which the spatial light pattern is periodic. For example, the threshold frequency may be set lower than the above-noted special frequency but higher than most of the frequency spectrum of image information attributable to the captured scene. Since most of the frequency spectrum of image information attributable to the captured scene (i.e., excluding image information attributable to the projected spatial light pattern) resides at lower frequencies, the provision of such a threshold frequency may make it possible to detect the local maximum of the spectrum attributable to the projected spatial light pattern. In this manner, spatial frequency $(u_m, v_m)$ at which the spatial light pattern is periodic may be detected. Processing may continue from block S3 to block S4.

At block S4, the frequency component calculating unit 42 may apply orthogonal transformation, such as the Fourier transform or the Hadamard transform, to a local image area around each pixel of interest at coordinates (x,y) to obtain frequency component $F_{x,y}(u_m,v_m)$. This local image area may be a rectangular image area centered at coordinates (x,y). Here, $F_{x,y}(u,v)$ may be a discrete Fourier transform (or Hadamard transform, or any other orthogonal transform) of pixel data, which are the pixel values of the pixel array of the local image area. Processing may continue from block S4 to block S5.

At block S5, the reflectance correcting unit 43 may correct $F_{x,y}(u_m,v_m)$ for different object reflectance. The spatial light pattern projected by the projection unit 11 may be reflected by an object surface to reach the imaging unit 12. The intensity of the reflected light may depend on the reflectance of the object surface. As a result, pixel values (i.e., luminance values) of the captured image are dependent on the reflectance of each object surface. As the reflectance of the object surface increases, the pixel value of a pixel situated within an image area corresponding to this object surface may also increase. It follows that the value of $F_{x,y}(u_m, v_m)$ may also depend on object surface reflectance. The reflectance correcting unit 43 may remove variation in $F_{x,y}(u_m,v_m)$ caused by differences in object surface reflectance. This correction process may be described later in detail. Processing may continue from block S5 to block S6.

At block S6, the depth map generating unit 44 may generate a depth map based on the corrected $F_{x,y}(u_m,v_m)$ and a lookup table. The lookup table may indicate a relationship between depths (i.e, positions in the z direction) and the values of the spatial frequency component $F_{x,y}(u_m, v_m)$. This lookup table may be prepared in advance and stored in memory.

Figure 6:
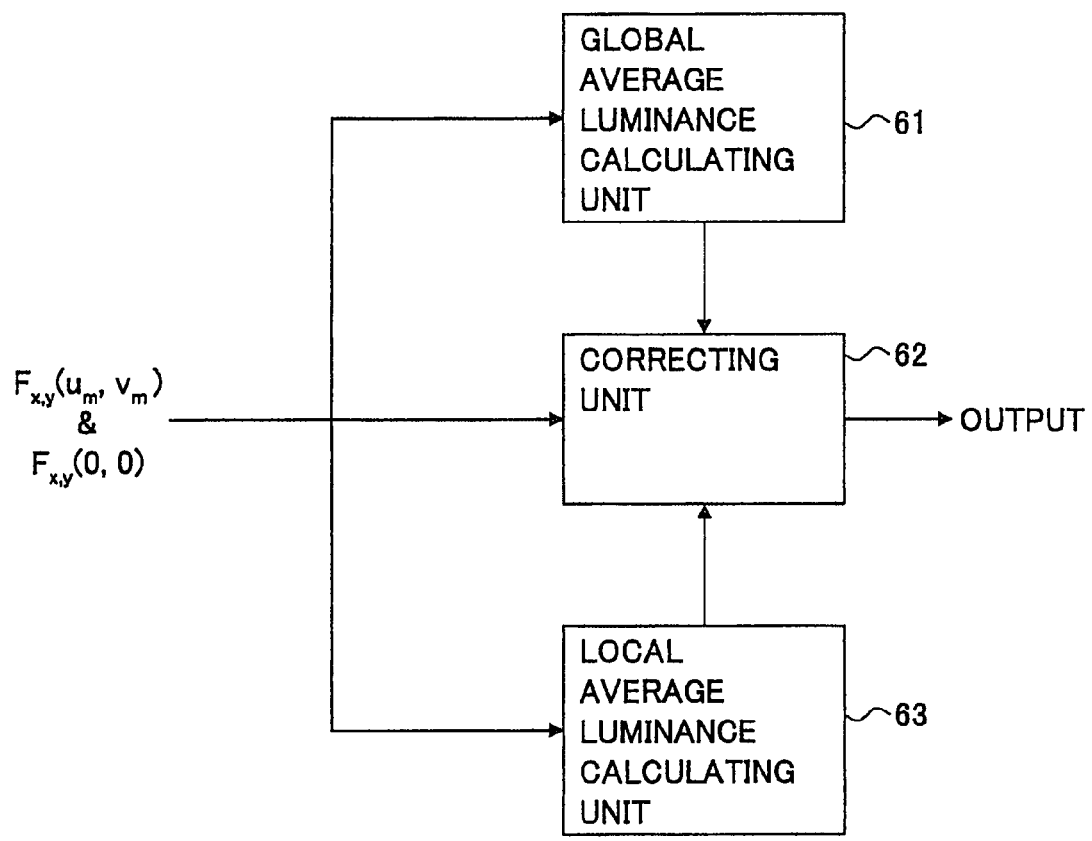
FIG. 6 is a block diagram illustrating an example of the configuration of a reflectance correcting unit.

FIG. 6 is a block diagram illustrating an example of the configuration of the reflectance correcting unit 43 arranged in accordance with at least some embodiments described herein. The reflectance correcting unit 43 illustrated in FIG. 6 may include a global average luminance calculating unit 61, a correcting unit 62, and a local average luminance calculating unit 63.

Figure 7:
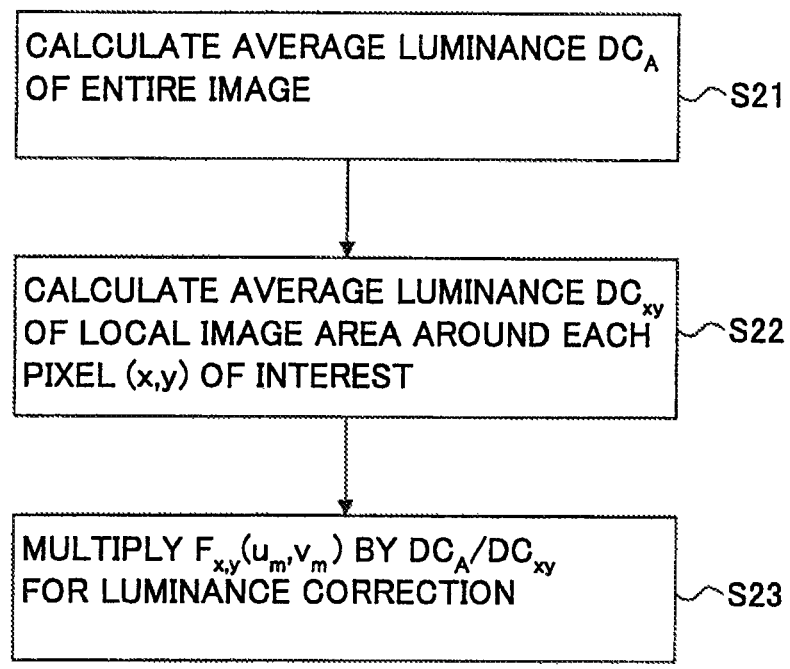
FIG. 7 is a flowchart illustrating the process of performing luminance correction performed by the reflectance correcting unit.

FIG. 7 is a flowchart illustrating a method for performing luminance correction performed by the reflectance correcting unit 43 arranged in accordance with at least some embodiments described herein. As depicted, an example method may include one or more operations, actions, or functions as illustrated by one or more of blocks S21, S22 and/or S23. As the method in FIG. 7 could be implemented using, for example, the reflectance correcting unit 43 depicted in FIG. 6, the method for performing luminance correction will be described by referring to FIG. 6 and FIG. 7. Processing may begin at block S21.

At block S21, the global average luminance calculating unit 61 may calculate average luminance $DC_A$ of the entire image. The average luminance $DC_A$ of the entire image may be calculated by adding up all the pixel values and by dividing the obtained sum by the number of pixels. Alternatively, the average luminance $DC_A$ of the entire image may be calculated by using a direct current component $F_{x,y}(0,0)$ that may be obtained together with $F_{x,y}(u_m,v_m)$. Since the direct current component $F_{x,y}(0,0)$ is proportional to the sum of pixel values within the local image area, the global average luminance calculating unit 61 may use $F_{x,y}(0,0)$ to obtain the average luminance $DC_A$ of the entire image. Processing may continue from block S21 to block S22.

At block S22, the local average luminance calculating unit 63 may calculate average luminance $DC_{xy}$ of a local image area around each pixel of interest situated at coordinates (x,y). The average luminance $DC_{xy}$ of the local image area may be calculated by adding up all the pixel values of the local image area and by dividing the obtained sum by the number of pixels. Alternatively, the average luminance $DC_{xy}$ of the local image area may be directly obtained from the direct current component $F_{x,y}(0,0)$. Processing may continue from block S22 to block S23.

At block S23, the correcting unit 62 may multiply $F_{x,y}(u_m, v_m)$ by $DC_A/DC_{xy}$ for luminance correction. It may be noted that local average luminance $DC_{xy}$ of a local image area may be proportional to the reflectance of an object surface corresponding to this local image area. Further, the value of $F_{x,y}(u_m,v_m)$ may also be proportional to the reflectance of the object surface corresponding to this local image area. Accordingly, multiplication by $DC_A/DC_{xy}$ may remove the effect of object-surface reflectance variation from $F_{x,y}(u_m,v_m)$. It may also be noted that for the purpose of removing the effect of object-surface reflectance variation, it may suffice to multiply $F_{x,y}(u_m, v_m)$ by $1/DC_{xy}$.

Figure 8:
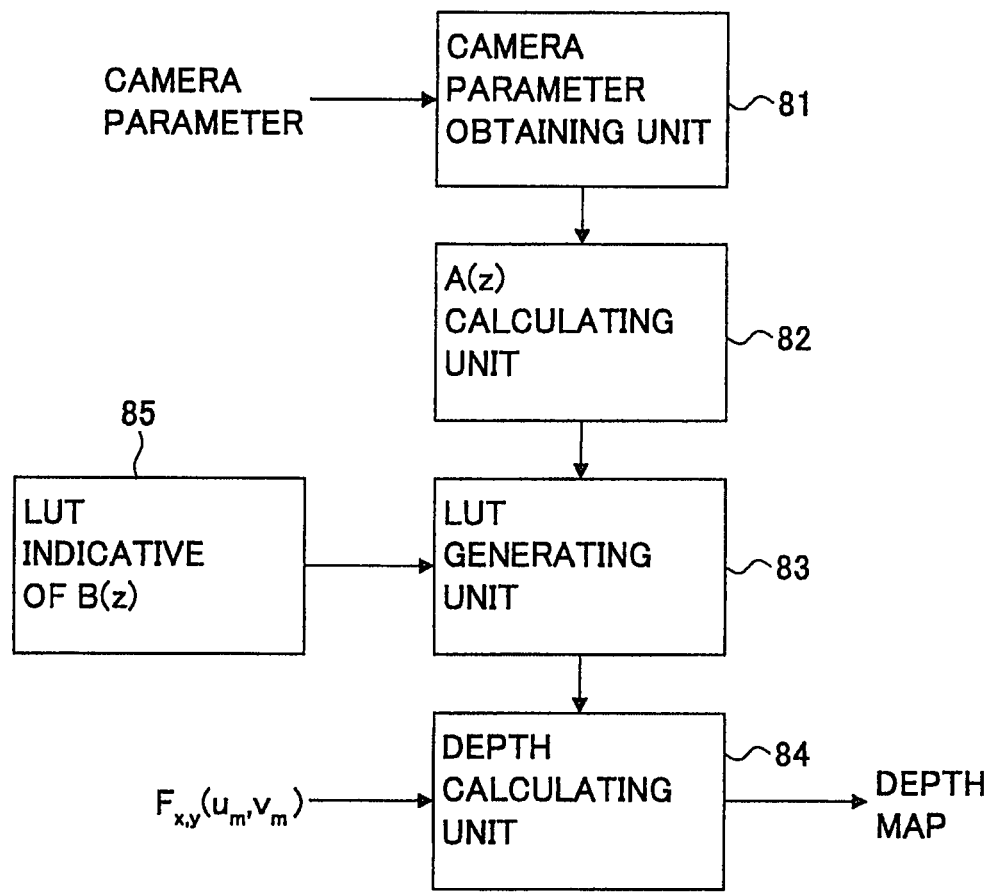
FIG. 8 is a block diagram illustrating an example of the configuration of a depth map generating unit.

FIG. 8 is a block diagram illustrating an example of the configuration of the depth map generating unit 44 arranged in accordance with at least some embodiments described herein. The depth map generating unit 44 illustrated in FIG. 8 includes a camera parameter obtaining unit 81, an A(z) calculating unit 82, an LUT generating unit 83, a depth calculating unit 84, and an LUT (lookup table) 85 indicative of B(z). A(z) may represent a relationship between position in the depth direction and the blurring of the spatial light pattern caused by the projection unit 11 that projects the spatial light pattern. B(z) may represent a relationship between position in the depth direction and the blurring of the spatial light pattern caused by the imaging unit 12 that captures an image.

Figure 9:
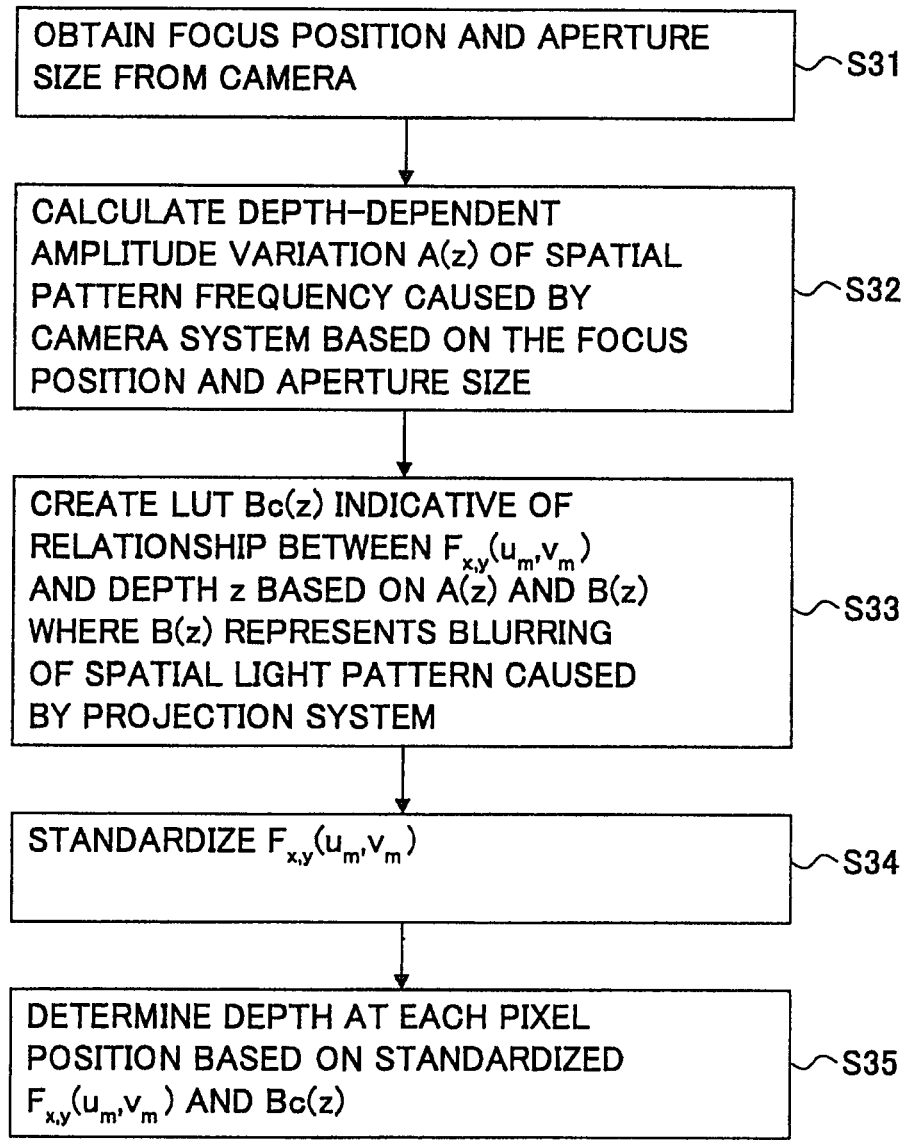
FIG. 9 is a flowchart illustrating a method for determining depth data performed by the depth map generating unit.

FIG. 9 is a flowchart illustrating a method for determining depth data performed by the depth map generating unit 44 arranged in accordance with at least some embodiments described herein. As depicted, an example method may include one or more operations, actions, or functions as illustrated by one or more of blocks S31, S32, S33, S34 and/or S35. The depicted example method determines depth data by combining the effect of focusing of the projection unit 11 with the effect of focusing of the imaging unit 12. As the method in FIG. 9 could be implemented using, for example, the depth map generating unit 44 depicted in FIG. 8, the method for determining depth data will be described by referring to FIG. 8 and FIG. 9. Processing may begin at block S31.

At block S31, the camera parameter obtaining unit 81 may obtain a focus position $z_{cf}$ in the z direction and an aperture size D from the imaging unit 12. The camera parameter obtaining unit 81 may also obtain a focus position $(x_{cf}, y_{cf})$, at which point in the x-y plane the imaging unit 12 focuses on an object surface. The aperture size D may typically be provided in the form of a focal length f and an f-number N. The aperture size (i.e., the diameter of an entrance pupil) D may then be calculated as D=f/N. Processing may continue from block S31 to block S32.

At block S32, the A(z) calculating unit 82 may calculate a depth-dependent amplitude variation A(z) of the spatial pattern frequency caused by the camera optical system (i.e., the imaging unit 12) as a function of depth z based on the focus position $z_{cf}$ and the aperture size D. This depth-dependent amplitude variation A(z) may represent the amplitude of the spatial frequency $(u_m,v_m)$ of the spatial light pattern on a surface positioned at depth z as viewed by the imaging unit 12 focusing on the focus position $z_{cf}$. This spatial light pattern may be an ideal spatial light pattern having no blurring on the surface positioned at depth z. Namely, the depth-dependent amplitude variation $A(z)$ may take into account only the blurring of the spatial light pattern caused by the imaging unit 12 under the condition in which the blurring of the spatial light pattern caused by the projection unit 11 is nonexistent.

The depth-dependent amplitude variation $A(z)$ may be obtained as follows. A point-spread function of the imaging unit 12 focusing on the distance $z_{cf}$ may be represented as $psf(x,y,z)$ that assumes a value of $(2(z_{cf}+z)/Dz)^2/pi$ (pi= 3.14 . . . ) within a circular area having a diameter of $Dz/(z_{cf}+z)$ and that assumes zero outside this circular area. The spatial light pattern positioned at depth z may then appear in an image captured by the imaging unit 12 as $p(x,y)=p_0(x,y)*psf(x,y,z)$ where $p_0(x,y)$ is the spatial light pattern at position $z_{cf}$ and the symbol "*" represents a convolution operation. An orthogonal transform (e.g., Fourier transform or Hadamard transform) of $p(x,y)$ with respect to x and y may be represented as $P(u,v)=P_0(u,v)PSF(u,v,z)$ where $P_0(u,v)$ and $PSF(u,v,z)$ are orthogonal transforms of $p_0(x,y)$ and $psf(x,y,z)$, respectively. Then, the depth-dependent amplitude variation $A(z)$ may be equal to $P(u_m,v_m)$ where $(u_m,v_m)$ is the spatial frequency at which the spatial light pattern is periodic. Processing may continue from block S32 to block S33.

At block S33, the LUT generating unit 83 may create a lookup table $Bc(z)$ indicative of a relationship between $F_{x,y}(u_m,v_m)$ and depth z based on $A(z)$ and $B(z)$ where $B(z)$ represents the blurring of the spatial light pattern caused by the projection unit 11. $B(z)$ may be obtained in advance as follows. First, the projection unit 11 may project the spatial light pattern (e.g., checkerboard pattern) on a blank, flat surface (e.g., white, flat surface) positioned at depth z while focusing on the depth $z_{pf}$ as described in connection with FIG. 1. An image of this spatial light pattern on the surface positioned at depth z may then be captured by the imaging unit 12 focusing on this surface positioned at depth z. A spatial light pattern $p(x,y,z)$ in the captured image may include blurring caused by the projection unit 11, but may not include blurring caused by the imaging unit 12. When an orthogonal transform of $p(x,y,z)$ with respect to x and y is denoted as $P(u,v,z)$, $B(z)$ may be represented as $P(u_m,v_m,z)$. $B(z)$ obtained in this manner in advance may be stored as a lookup table $B(z)$ in memory. The depth-dependent amplitude variation that factors in both the blurring caused by the projection unit 11 and the blurring caused by the imaging unit 12 may then be represented as $A(z)B(z)$. Namely, $A(z)B(z)$ may be stored as a lookup table $Bc(z)$. It may be noted that $B(z)$ may alternatively be obtained as the depth-dependent characteristics of a point-spread function by projecting a single light spot rather than the spatial light pattern such as a checkerboard pattern. It may further be noted that $B(z)$ may alternatively be obtained as a mathematical formula that approximates a point-spread function of the projection unit 11. The point spread function may be similar to $psf(x,y,z)$ previously described, or may be represented by a Gaussian function. When $B(z)$ is provided as a mathematical formula, $Bc(z)$ may also be obtained as a mathematical formula rather than as a lookup table. Processing may continue from block S33 to block S34.

At block S34, the depth calculating unit 84 may standardize $F_{x,y}(u_m, v_m)$ for a luminance factor. As previously described, the value of the frequency component as corrected by the reflectance correcting unit 43 for reflectance variation may be $F_{x,y}(u_m, v_m)DC_A/DC_{xy}$. The focus position $(x_{cf},y_{cf})$ at which point in the x-y plane the imaging unit 12 focuses on an object surface may be obtained from the imaging unit 12 in block S1 of FIG. 9. The value of $F_{x,y}(u_m,v_m)DC_A/DC$, at this focus position $(x_{cf},y_{cf})$ may be denoted as Rxy. Then, the depth calculating unit 84 may standardize the value of $F_{x,y}(u_m, v_m)DC_A/DC_{xy}$ at any given spatial coordinates (x,y) in the captured image by multiplying this value by $Bc(z_{cf})/Rxy$. This standardization process may ensure that the amplitude of the spatial frequency $(u_m,v_m)$ at the focus position $(x_{cf},y_{cf})$ at the focus depth $z_{cf}$ be equal to $Bc(z_{cf})$. Processing may continue from block S34 to block S35.

At block S35, the depth calculating unit 84 may determine a depth at each pixel position based on the standardized $F_{x,y}(u_m,v_m)$ and $Bc(z)$. Namely, the depth calculating unit 84 may refer to the lookup table $Bc(z)$ to find a depth z associated with the $(F_{x,y}(u_m, v_m)DC_A/DC_{xy})\times(Bc(z_{cf})/Rxy)$. The depth z found in the lookup table $Bc(z)$ may be the depth at which an object surface corresponding to the pixel position (x,y) is positioned in the scene captured by the imaging unit 12.

In the manner described above, the blurring of the spatial light pattern caused by the projection unit 11 and the blurring of the spatial light pattern caused by the imaging unit 12 may both be taken into account in a depth map generated by the depth map generating unit 44. Further, as previously noted, despite the focusing of the imaging unit 12, provision may easily be made such that the blurring of the spatial light pattern in the captured image monotonously increases or decreases in the depth direction z. Such monotonous characteristics may be provided by ensuring that a monotonous blurring increase (or decrease) in the depth direction caused by the projection unit 11 be predominant over a blurring change in the depth direction caused by the imaging unit 12.

Figure 10:
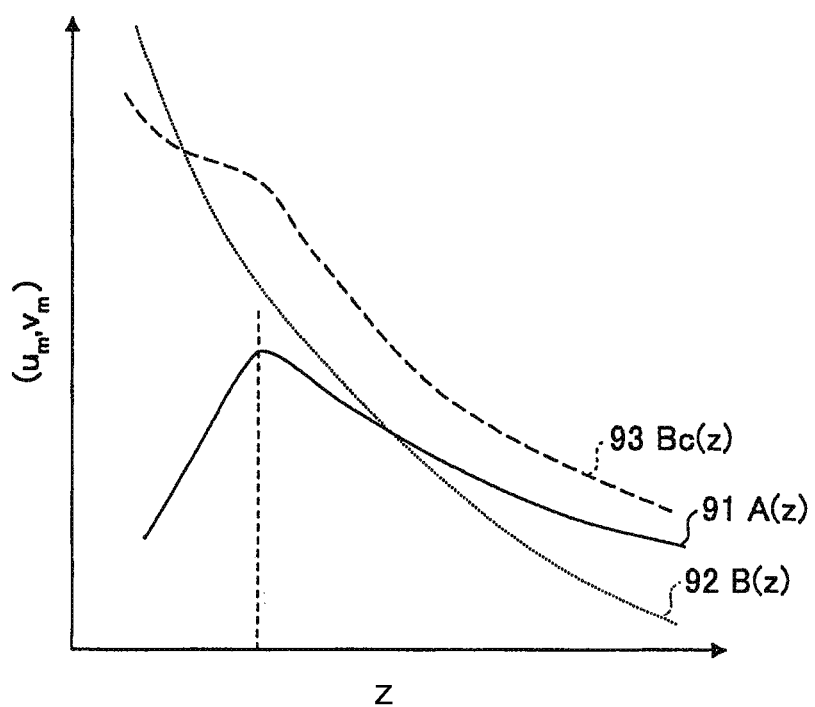
FIG. 10 is a drawing illustrating an example of a monotonous blurring increase in the depth direction; all arranged in accordance with at least some embodiments described herein.

FIG. 10 is a drawing illustrating an example of a monotonous blurring increase in the depth direction arranged in accordance with at least some embodiments described herein. The horizontal axis may represent depth z, and the vertical axis may represent the amplitude of the spatial frequency $(u_m,v_m)$. A characteristic curve 91 may correspond to $A(z)$, which may represent the blurring of the spatial light pattern caused by the imaging unit 12. The imaging unit 12 may have a focus position at an object of interest, so that the characteristics curve 91 may have a maximum peak at this focus position in the depth direction z. A characteristic curve 92 may correspond to $B(z)$, which may represent the blurring of the spatial light pattern caused by the projection unit 11. The projection unit 11 may have a focus position at the nearest point in the depth direction z, so that the characteristics curve 92 monotonously falls as depth z increases. Namely, the blurring represented by the characteristic curve 92 may monotonously increase as depth z increases.

As illustrated in FIG. 10, provision may be made such that a monotonous blurring increase in the depth direction caused by the projection unit 11 be predominant over a blurring change in the depth direction caused by the imaging unit 12. Accordingly, a characteristics curve 93 which corresponds to $Bc(z)=A(z)B(z)$ may monotonously fall as depth z increases. That is, blurring obtained by combining the blurring caused by the projection unit 11 and the blurring caused by the imaging unit 12 may monotonously increase as depth z increases. With such blurring characteristics, depth data may be uniquely determined from a given amplitude of the spatial frequency $(u_m,v_m)$.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally may include one or more of a system unit housing, a video display device, a memory such as volatile and non-volatile memory, processors such as micro-processors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include a global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method to generate a stereoscopic image from a single two-dimensional image based on depth data, comprising:
    calculating a value of a spatial frequency component of image data in a local image area around a pixel of interest from the single two-dimensional image, wherein the image data is representative of one or more objects on which a spatial light pattern is projected and blurring of the spatial light pattern in the image data increases in a first depth direction and decreases in a second depth direction, the value of the spatial frequency component being based on the increase or decrease of the blurring;
    determining depth data corresponding to the calculated value of the spatial frequency component from the single two-dimensional image by utilizing a preset relationship between depths and values of the spatial frequency component, the values corresponding to the increase or decrease of the blurring; and
    generating the stereoscopic image from the determined depth data corresponding to the calculated value of the spatial frequency component from the single two-dimensional image.

2. The method of claim 1, further comprising detecting a spatial frequency at which a spatial frequency spectrum of the single two-dimensional image has a maximum value in a frequency range above a threshold frequency, wherein the calculated value of the spatial frequency component is a value of a spatial frequency component at the detected spatial frequency, and wherein the spatial light pattern in the image data is at least periodic at a spatial frequency above the threshold frequency.

3. The method of claim 1, wherein the spatial frequency at which the spatial light pattern in the single two-dimensional image is periodic is a higher spatial frequency than spatial frequencies that are perceivable to human vision when the image data is viewed.

4. The method of claim 1, wherein the local image area is a rectangular area, and the calculating a value of a spatial frequency component comprises calculating spatial frequency components by applying orthogonal transformation to the rectangular area.

5. The method of claim 1, further comprising correcting the calculated value of the spatial frequency component for a reflectance of an object appearing in the local image area of the single two-dimensional image.

6. The method of claim 5, wherein the correcting the calculated value comprises dividing the calculated value by an average luminance of the single two-dimensional image in the local image area.

7. The method of claim 1, further comprising:
    calculating the preset relationship between depths and values of the spatial frequency component based on first data and second data, wherein the first data is indicative of a first relationship between position in the depth direction and blurring of the spatial light pattern caused by a projection system for projecting the spatial light pattern and the second data is indicative of a second relationship between position in the depth direction and blurring of the spatial light pattern caused by an imaging system for capturing the single two-dimensional image.

8. The method of claim 7, wherein the second data is determined by calculating the blurring of the spatial light pattern caused by the imaging system with respect to different positions in the depth direction based on data indicative of a focus position of the imaging system in the depth direction and a lens aperture size of the imaging system.

9. The method of claim 7, wherein the first data is determined by:
projecting the spatial light pattern from the projection system to a flat, monotonous surface;
capturing—the single two-dimensional image of the spatial light pattern projected on the surface by use of the imaging system focusing on the surface; and
performing the projecting the spatial light pattern and the capturing the single two-dimensional image of the spatial light patter with respect to flat, monotonous surfaces placed at different positions in the depth direction.

10. An apparatus to generate a stereoscopic image from a single two-dimensional image based on depth data, comprising:
a frequency component calculating unit configured to calculate a value of a spatial frequency component of image data in a local image area around a pixel of interest from the single two-dimensional image, wherein the image data is representative of one or more objects on which a spatial light pattern is projected and blurring of the spatial light pattern in the image data increases in a first depth direction and decreases in a second depth direction, the value being based on the increase or decrease of the blurring;
a depth map generating unit configured to determine depth data corresponding to the calculated value of the spatial frequency component from the single two-dimensional image by utilizing a preset relationship between depths and values of the spatial frequency component, the values corresponding to the increase or decrease of the blurring; and
a stereoscopic image generating unit configured to generate the stereoscopic image from the determined depth data corresponding to the calculated value of the spatial frequency component from the single two-dimensional image.

11. The apparatus of claim 10, further comprising a frequency detecting unit configured to detect a spatial frequency at which a spatial frequency spectrum of the single two-dimensional image has a maximum value in a frequency range above a threshold frequency, wherein the calculated value of the spatial frequency component is a value of a spatial frequency component at the detected spatial frequency, and wherein the spatial light pattern in the image data is at least periodic at a spatial frequency above the threshold frequency.

12. The apparatus of claim 10, wherein the spatial frequency at which the spatial light pattern in the image is periodic is a higher spatial frequency than spatial frequencies that are perceivable to human vision when the single two-dimensional image is viewed.

13. The apparatus of claim 10, wherein the frequency component calculating unit is configured to calculate spatial frequency components by applying orthogonal transformation to a rectangular area that is the local image area.

14. The apparatus of claim 10, further comprising a reflectance correcting unit configured to correct the calculated value of the spatial frequency component for a reflectance of an object appearing in the local image area of the single two-dimensional image.

15. The apparatus of claim 14, wherein the reflectance correcting unit is configured to divide the calculated value by an average luminance of the single two-dimensional image in the local image area.

16. The apparatus of claim 10, wherein the depth map generating unit comprises:
a relationship calculating unit configured to calculate the preset relationship between depths and values of the spatial frequency component based on first data and second data, wherein the first data is indicative of a first relationship between position in the depth direction and blurring of the spatial light pattern caused by a projection system for projecting the spatial light pattern and the second data is indicative of a second relationship between position in the depth direction and blurring of the spatial light pattern caused by an imaging system for capturing the single two-dimensional image.

17. The apparatus of claim 16, wherein the blurring data obtaining unit is configured to calculate the blurring of the spatial light pattern caused by the imaging system with respect to different positions in the depth direction based on a focus position of the imaging system and a lens aperture size of the imaging system.

18. A system to generate a stereoscopic image from a single two-dimensional image based on depth data, comprising:
a projection unit configured to project a spatial light pattern; and
an imaging unit configured to capture the single two-dimensional image of one or more objects on which the spatial light pattern is projected, wherein blurring of the spatial light pattern in the single two-dimensional image monotonously increases or decreases in a depth direction such that depth data corresponding to a calculated value of a spatial frequency component of the single two-dimensional image in a local image area around a pixel of interest can be determined by utilizing a preset relationship between depths and values of the spatial frequency component, the spatial frequency component being based on the increase or decrease of the blurring and the values of the spatial frequency component corresponding to the increase or decrease of the blurring, wherein the imaging unit is further configured to generate the stereoscopic image from the depth data corresponding to the calculated value of the spatial frequency component from the single two-dimensional image.

19. The system of claim 18, wherein the spatial light pattern comprises a checkerboard pattern in which a size of each square area of the checkerboard pattern is at least twice as large as a pixel size in an x direction and in a y direction.

* * * * *